April 8, 1952 A. R. MORGAN 2,592,313
SIGNAL VOLUME VARYING SYSTEM
Filed Dec. 11, 1947 2 SHEETS—SHEET 1

INVENTOR.
Adolph R. Morgan
BY
ATTORNEY.

Patented Apr. 8, 1952

2,592,313

UNITED STATES PATENT OFFICE 2,592,313

SIGNAL VOLUME VARYING SYSTEM

Adolph R. Morgan, Princeton, N. J., assignor to Radio Corporation of America, a corporation of Delaware Application December 11, 1947, Serial No. 791,071

6 Claims. (Cl. 179—171)

This invention relates to electrical current transmission systems, and particularly to a form of automatic volume regulating circuit known as a compressor or limiter.

The use of compression and limiting amplifiers in sound recording studios and in radio broadcasting systems is well-known, and several types are in general use. In the conventional compression amplifier, gain or volume reduction is achieved by increasing the negative bias voltage on the grid of a variable gain vacuum tube, the bias voltage being obtained by amplification and rectification of an audio frequency voltage taken from the output of the amplifier. The variable gain tubes are generally operated in push-pull to eliminate the low frequency surge or "thump" superimposed upon the signal voltage. A compression amplifier of this type is disclosed and claimed in Singer U. S. Patent No. 2,255,683 of September 9, 1941, and also in Miller U. S. Patent No. 2,312,260 of February 23, 1943.

To eliminate the low frequency surge, each half of the push-pull variable gain stage must be perfectly balanced; that is, the dynamic operating characteristics of the pair of tubes must be identical throughout their operating range. This requires a careful selection and aging of the tubes, and a precise adjustment of the electrode potentials during operation of the circuit. Various types of testing systems have been suggested for obtaining variable mu tubes with identical curved characteristics, one such system being disclosed and claimed in Bayless U. S. Patent No. 2,385,186 of September 18, 1945.

It is realized, therefore, that such compression amplifiers require attention and close adjustments to maintain "thump"-free compression, and the present invention is directed to a compression system not subject to these limitations, and to one which is inherently free of direct current changes giving rise to "thumps." Instead of varying the bias voltage on a pair of push-pull variable gain tubes, a new control unit, called a "dynastat," has been devised and utilized in the transmission circuit. The dynastat is a combined magnetic and electrostatic mechanical transducer, and comprises a dynamic driving system and an electrostatic pickup, similar, in many respects, to a dynamic loud speaker having a voice coil centered in a magnetic field and rigidly attached to a diaphragm. Motion of the diaphragm is converted into voltage variations by a capacity pickup electrode, the alternating voltage generated at the electrode being directly proportional to the amplitude of vibration of the diaphragm. By varying the field coil strength in accordance with the signal level, the alternating voltage generated at the electrode varies with the signal level.

The principal object of the invention, therefore, is to facilitate and improve the compression of a signal being transmitted.

Another object of the invention is to provide an improved compression and limiting system inherently free of distortion caused by low frequency surges.

A further object of the invention is to provide an improved system for controlling the signal level in accordance with the value of the signal level.

A still further object of the invention is to provide an improved unit for transforming signal voltages from one level to another level in accordance with the original value of the signal level.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 1:
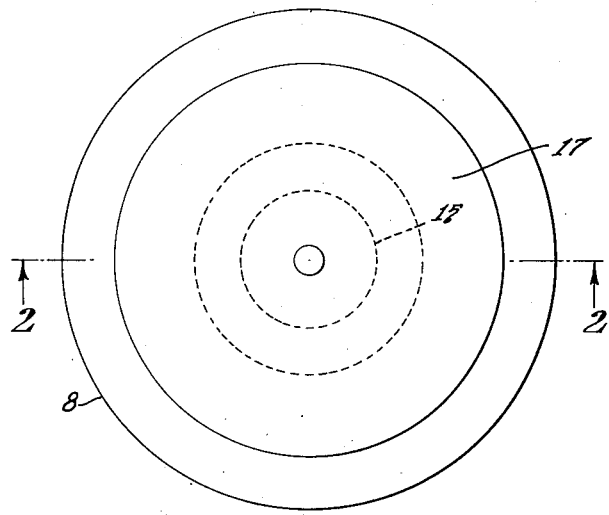
Fig. 1 is a plan view of the dynastat unit.
Figure 2:
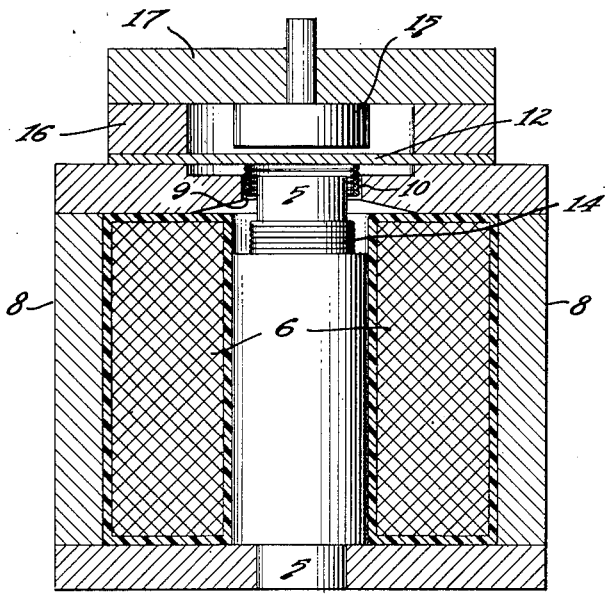
Fig. 2 is a cross-sectional view of the dynastat unit taken along the line 2—2 of Fig. 1.

Referring now to Figs. 1 and 2, the dynastat unit is comprised of a magnetic core 5 surrounded by a field winding 6, the magnetic path being in the core 5 and a shell 8 to form an annular air gap 9. Positioned within the air gap 9 is a coil 10 attached to a diaphragm 12 held by a clamping ring 16, the diaphragm being vibrated when current is passed through the coil 10. Surrounding the core 5, and immediately under the coil 10, is a second coil 14, the purpose of which will be explained hereinafter. Positioned immediately above the diaphragm 12 is a pickup electrode or button 15 held in the insulating support 17.

When a direct current is supplied to the field coil 6 and a signal current is supplied to the coil 10, the diaphragm 12 will vibrate in proportion to the amplitude of the signal current. The diaphragm has been made sufficiently stiff to have a natural frequency near 19 kilocycles, and thus, no resonance occurs within the audio range.

Motion of the diaphragm 12 is converted into voltage variations by the capacity pickup electrode 15 which is maintained at a potential of approximately 115 volts positive with respect to the diaphragm. Thus, the alternating current voltage generated at the electrode 15 varies in accordance with the amplitude of vibration of the diaphragm.

As mentioned above, the flux in the air gap 9 in the magnetic path is generated by direct current flowing in the coil 6, and thus, the sensitivity of the dynastat can be controlled by varying this field current. Now, if the field current is made a function of the signal level with higher levels resulting in lower field currents, the dynastat becomes a compression device and with the reverse action, expansion is obtained.

Since the diaphragm drive is magnetic and the pickup from the diaphragm is electrostatic, the output voltage is inherently free of direct disturbances due to sudden changes in the magnetic field current. There is, however, a second order effect which can cause a disturbance in the output. This second order effect is that a change in magnetic flux will induce a voltage in the coil 10 which will result in a current in this coil, which current will produce motion of the coil 10. This difficulty is eliminated by the use of coil 14, known as a "bucking" coil, and which is placed in close proximity to coil 10 so that essentially the same field flux threads both coils. By adjusting the number of turns in the bucking coil 14, the voltage induced therein by any change in magnetic flux caused by current changes in the field coil 6, will be the same as the voltage induced in coil 10. Now, by connecting the coils 10 and 14 in series, with the proper polarity, the resulting voltage in the series circuit will be zero for changes in magnetic flux. Therefore, there will be no current in the circuit of coil 10 for magnetic flux changes, and thus, no disturbance in the output voltage.

There is also a further advantage obtained from the use of the bucking coil 14 adjusted and connected as explained above. That is, the magneto-motive forces generated in the coil 10 and in the bucking coil 14, due to signal current, will neutralize each other, and hence, have no effect on the flux due to the field coil. If the magneto-motive force, due to coil 10, were not neutralized, the instantaneous flux through coil 10 would change with the signal current resulting in distortion which would become serious when the field flux became small.

Figure 3:
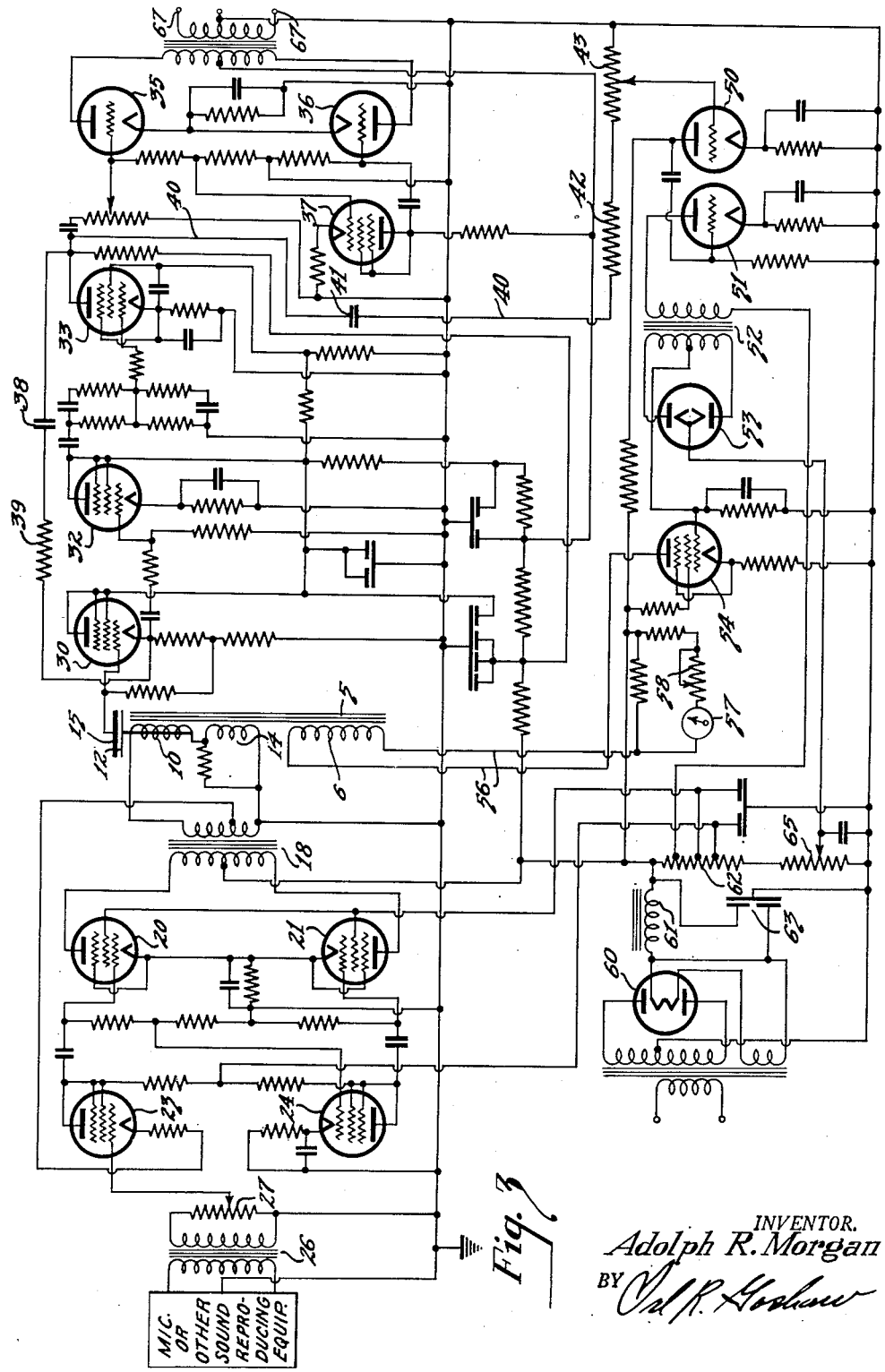
Fig. 3 is a schematic drawing of a transmission circuit embodying the invention.

Referring now to Fig. 3, showing the connections of the dynastat in a transmission channel, the dynastat coils and elements have been given the same numerals as in Figs. 1 and 2. It will be noted that the coils 10 and 14 are connected in series, and the input thereto is from the secondary of a transformer 18, the primary of which is connected in the output of a push-pull amplifier comprising tubes 20 and 21, typical tubes being 6L6's. This output stage will deliver substantially 15 watts undistorted power to the coils 10 and 14. The input to push-pull amplifier 20—21 is from an unbalanced tube circuit including amplifier tube 23, such as a 6J7, and a phase inverter tube 24, also a 6J7. These tubes are resistance-capacity coupled by the usual resistors and condensers as shown. A 14 db feedback is provided between the output of the push-pull stage and the cathode of tube 23. The input to tube 23 is over a transformer 26 having an output potentiometer 27 across the secondary thereof. The primary of the input transformer 26 may be connected to a microphone or any other similar generating device, such as a sound film, phonograph disc, or the like.

Referring again to the dynastat unit, the pickup electrode 15 is connected to the grid of a 6J7 tube 30 connected in a cathode-follower stage. The output of the cathode-follower stage is impressed on single stage cascade-connected amplifiers 32 and 33, condenser-resistor coupled, and then on a push-pull stage consisting of tubes 35 and 36. Tube 37 is a phase inverter tube like tube 24 ahead of the dynastat. The condensers and resistors shown interconnecting these tubes are the usual coupling, filter, and voltage dividing elements well-known in the art. Negative feedback to the cathode-follower stage is from the plate of tube 33 over a .1 mfd. condenser 38 and a 1 megohm resistor 39 to the cathode of tube 30. This feedback is in phase with the feedback developed in the cathode-follower connection of tube 30, and thus, the two feedback voltages add directly, which provide a better load impedance relationship than is obtainable with tube 30 alone.

Referring now to the control circuit for the dynastat, the output of tube 33 is connected over conductor 40, condenser 41, resistor 42, and a potentiometer 43 to a pair of cascade-connected amplifier tubes 50 and 51. The output of tube 51 is connected over transformer 52 to a full-wave rectifier 53, the output of which is amplified in a direct current amplifier 54. The output of tube 54 is connected over conductors 56 to the field coil 6 of the dynastat, the circuit including a milliammeter 57 for indicating the db gain reduction. A potentiometer 58 permits zero adjustment of the meter 57.

In the lower left-hand corner of the drawing is the usual power supply consisting of a full-wave rectifier 60 with a filter choke 61 and condenser and resistance filter elements 62 and 63, respectively. The break away point or compression threshold is obtained by adjustment of potentiometer 65. Since the operation of the dynastat is not dependent upon any particular type of amplifier, the details of the interconnecting circuits have not been given, but the operation thereof for controlling or for introducing compression in the signal will now be explained.

As mentioned above, the alternating voltage generated at electrode 15 is directly related to the amplitude of vibration of the diaphragm 12, which amplitude of vibration varies in accordance with the amplitude of the signal currents in coils 10 and 14 and the current in field coil 6. Thus, for a given signal current amplitude, the diaphragm vibration level varies with the field coil current, and if this latter current decreases with signal current amplitude, the signal current at output terminals 67 will be compressed. If the reverse action occurs, expansion of the signal current results.

The signal current amplitude is impressed on potentiometer 43, and the amount of compression introduced is controlled and established by the setting of this potentiometer. After the desired amplification in tubes 50 and 51, rectification by tube 53, and amplification by tube 54, the direct current output of tube 54 fed to coil 6 decreases with signal current increases. By the setting of the slider of potentiometer 65, the break away or point where compression or expansion begins is controlled. Similar controls are described in the above mentioned Singer patent.

The above compressor or expander system provides freedom from continual vigilance as to balance of a variable gain push-pull stage of amplification, and thus, avoids distortion caused by low frequency surges superimposed on the signal current, the system being "thump" free.

I claim:

1. A signal transmission system comprising a signal amplifier, an electrical current to mechanical motion transducer on which the output of said amplifier is impressed, said transducer including a mechanical motion to electrical voltage portion, a second amplifier on which the output of said transducer is impressed, means for deriving a direct current varying in accordance with the variations in amplitude of the output of said second amplifier, and means for impressing said direct current on said transducer to vary its sensitivity and the amplitude ratio between the output of said first mentioned amplifier and the input to said second amplifier, said transducer including a magnetic core, a field coil on which said direct current is impressed, a signal current coil on which the output of said first mentioned amplifier is impressed, a diaphragm attached to said signal current coil, and an electrostatic electrode positioned adjacent said diaphragm, variations in voltage between said diaphragm and electrode being impressed on the input of said second amplifier.

2. A signal transmission system in accordance with claim 1, in which said transducer further includes a second signal coil connected in series with said first mentioned signal coil and producing a neutralizing magnetic field for said first signal coil to reduce disturbances from varying magnetic flux.

3. A magnetic electrostatic transducer unit for volume control of a signal comprising means for generating an electric current, means for amplifying said current, means for forming a magnetic field, a first coil in said field, means for connecting the output of said amplifying means to said first coil, a diaphragm attached to said coil, an electrode adjacent said diaphragm for generating voltages in accordance with the deflections of said diaphragm, the amount of said deflection of said diaphragm at any instant being proportional to the amplitude of the currents in said coil at said particular instant, a second coil in said field, said second coil being connected in series with said first coil and so polarized with respect to the polarization of said first coil that no resulting voltage is generated in said coils during changes in said magnetic field, a second amplifying means, means for connecting said electrode and said first mentioned connections between said first amplifying means and said first coil to the input of said second amplifying means, the generated currents caused by movement of said diaphragm being impressed on said second amplifying means, a rectifier circuit connected to the output of said second amplifying means, and means for connecting the output of said rectifier to said means for forming a magnetic field for said transducer unit.

4. A transducer for translating electrical energy into mechanical energy and mechanical energy into electrical energy comprising a source of electrical energy, an amplifier for said energy, means for forming a magnetic field, said means including a field coil, a second coil positioned in said magnetic field, a diaphragm connected to said second coil and adapted to be vibrated in accordance with the currents in said second coil and said field coil, means for connecting the output of said amplifier to said second coil, an electrode positioned adjacent said diaphragm for generating voltages corresponding to the movements of said diaphragm, a cathode follower amplifier, means for connecting said electrode and said connection between said first amplifier and said second coil to the input of said cathode follower amplifier, a rectifier connected to said last mentioned amplifier, means for connecting said field coil to the output of said rectifier, and a third coil adjacent said second coil in said magnetic field, said second and third coils being connected and polarized so their magnetic fields neutralize one another.

5. An electrical compressor system for audio signals in a transmission channel comprising a first amplifier of said signals, a transducer connected to the output of said amplifier, said transducer including a coil actuated diaphragm and an electromagnet for translating said audio signals into corresponding mechanical motion and a fixed electrode for generating electrical energy from said mechanical motion, an amplifier for said generated electrical energy, a rectifier connected to said last mentioned amplifier for deriving a direct current varying in accordance with the amplitude of said generated energy, and means for connecting the output of said rectifier to said electromagnet for translating said direct current into mechanical motion simultaneously with the the translation of said audio signals into mechanical motion.

6. A compressor in accordance with claim 5, in which means are provided for determining the ratio between the generated energy and the derived direct current therefrom, and further means are provided for determining the level at which said derived energy varies the translation of said electrical energy into mechanical motion.

ADOLPH R. MORGAN.

REFERENCES CITED

The following references are of record in the file of this patent:

UNITED STATES PATENTS

| Number | Name | Date |
|---|---|---|
| 791,655 | Shreeve | June 6, 1905 |
| 1,893,671 | Hentschel | Jan. 10, 1933 |
| 1,901,331 | Pridham | Mar. 14, 1933 |
| 1,950,144 | Hentschel | Mar. 6, 1934 |
| 1,967,125 | Miller | July 17, 1934 |
| 2,134,757 | Goldsmith | Nov. 1, 1938 |
| 2,137,435 | Yolles | Nov. 22, 1938 |
| 2,158,268 | Baker | May 16, 1939 |
| 2,229,296 | LaMar et al. | Jan. 21, 1941 |
| 2,416,557 | Wiener | Feb. 25, 1947 |
| 2,431,824 | Poch | Dec. 2, 1947 |